(No Model.) 2 Sheets—Sheet 1.

A. G. WILKINS.
APPARATUS FOR SECURING BUTTON FASTENERS.

No. 266,940. Patented Oct. 31, 1882.

Attest:
Walter Fowler,
R. K. Evans

Inventor:
Alex. G. Wilkins
by A. H. Evans & Co.
Attys.

(No Model.) 2 Sheets—Sheet 2.
A. G. WILKINS,
APPARATUS FOR SECURING BUTTON FASTENERS.
No. 266,940. Patented Oct. 31, 1882.
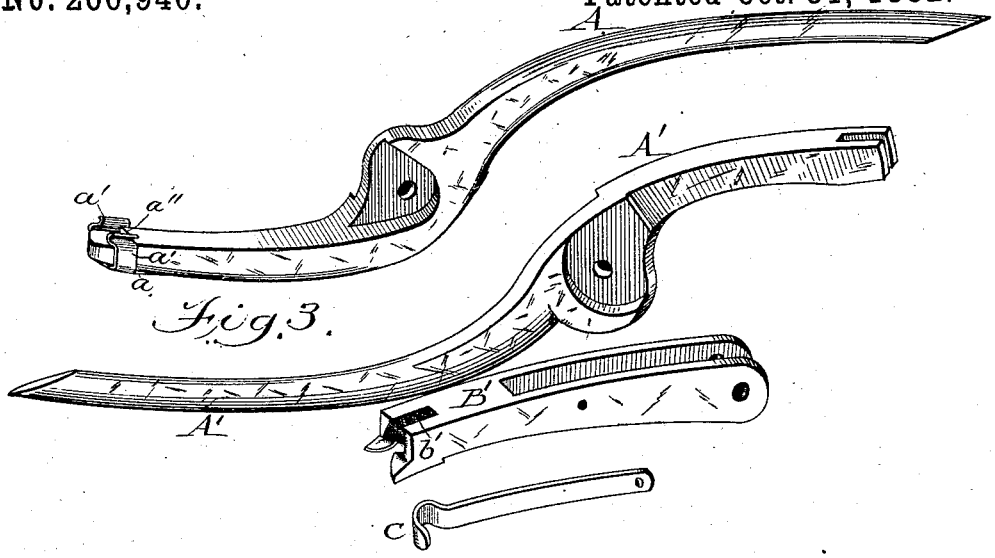
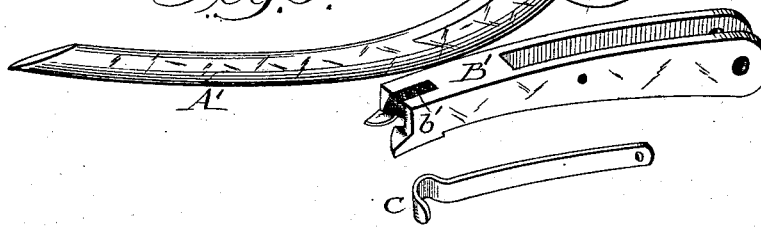
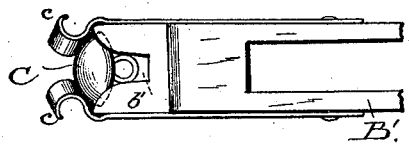
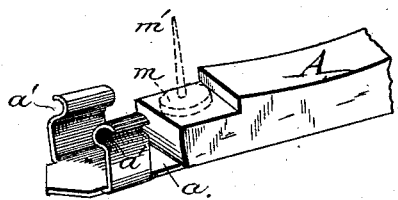
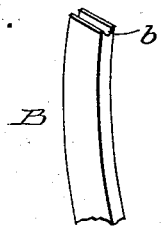
Attest;
S. Walter Fowler,
R. K. Evans
Inventor;
Alex'd G. Wilkins
by A. H. Evans & Co.
Attys.

United States Patent Office.

ALEXANDER G. WILKINS, OF MEADVILLE, PENNSYLVANIA.

APPARATUS FOR SECURING BUTTON-FASTENERS.

SPECIFICATION forming part of Letters Patent No. 266,940, dated October 31, 1882.

Application filed August 29, 1882. (No model.)

*To all whom it may concern:*

Be it known that I, ALEXANDER G. WILKINS, of Meadville, in the county of Crawford and State of Pennsylvania, have invented a new and useful Improvement in Apparatus for Securing Metallic Button-Fasteners; and I do hereby declare the following to be a full, clear, and exact description, reference being had to the accompanying drawings, making a part of this specification, in which—

Figure 1:
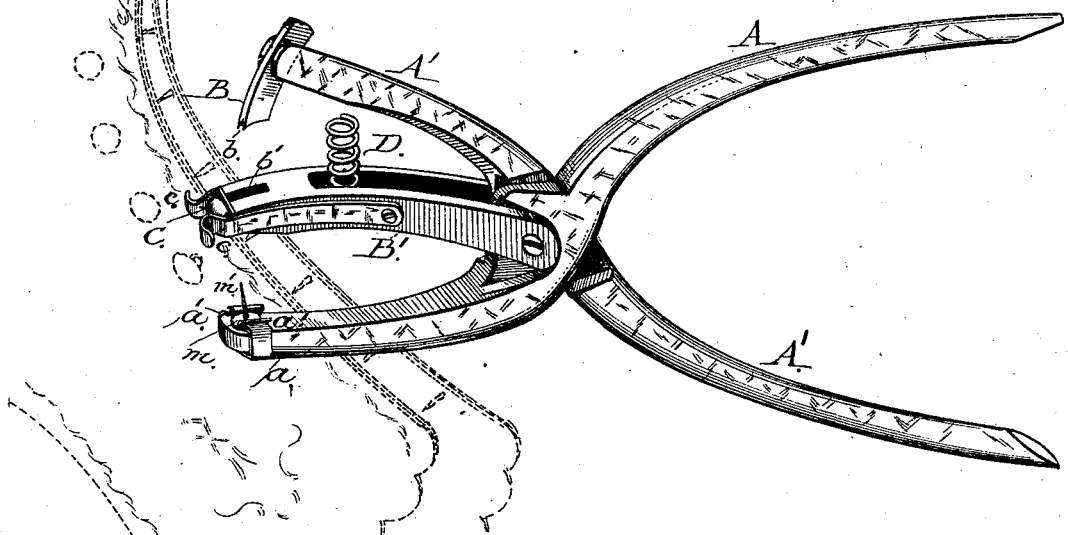
Figure 2:
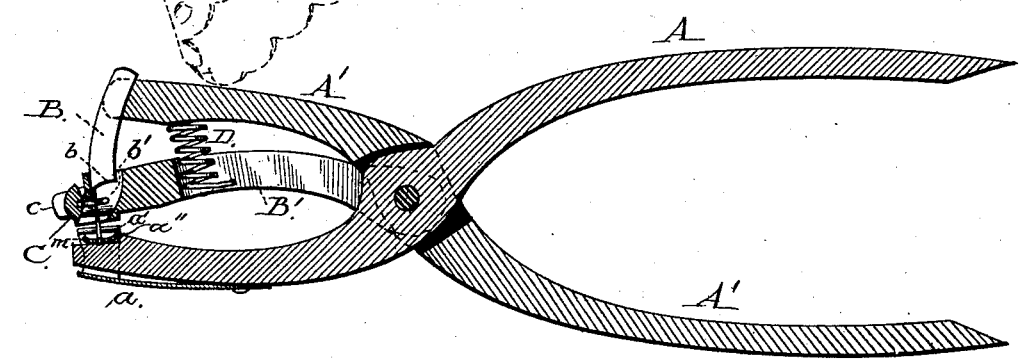

Figure 1 is a perspective view of my invention. Fig. 2 is a longitudinal section. Fig. 3 shows the parts detached. Fig. 4 shows the button-holder with a button in position for fastening. Fig. 5 shows the fastening-holder with a fastening in position, the spring being partially removed. Fig. 6 are details to be referred to.

My invention relates to an apparatus for securing buttons by bending metallic fasteners, and more especially the metallic fasteners for which I have filed an application for a patent; and it consists in the combination of devices hereinafter explained and claimed.

To enable others skilled in the art to make and use my invention, I will proceed to describe the exact manner in which I have carried it out.

In the drawings, A A' represent a pair of cross-arms, pivoted together as in any ordinary hand-punch. On the forward end of arm A, I secure the spring $a$, provided with the flanges $a'$. These flanges envelop each side of the arm, as shown in Fig. 3, and are curved so as to embrace and hold the metallic washer $m$ and fastener $m'$ in position while the fastener is being forced through the leather or other material and through the eye of the button. A shoulder, $a''$, on the face of the arm A acts as a stop, against which the metallic washer rests when slipped between the flanges $a'$, as shown in Fig. 2. The forward end of this arm A' is slotted to receive the finger B, which may be made adjustable in any of the well-known ways. This finger is made flat, and at its lower end is the curved groove $b$, for a purpose hereinafter explained.

Between the two arms A and A', secured by the same pivot, is the slotted bar B', as shown in Fig. 1. The outer end of this bar is recessed to receive the button C, with the eye of the button resting horizontally in the slot $b'$, and the button is held in position by the side springs, $c\ c$. When the arms A and A' approach each other the point of the fastener $m'$ is forced through the leather, which lies against the under face of the bar B', and then into the slot $b'$ and through the eye of the button. Between the bar B' and the arm A', I interpose the coil-spring D, of sufficient resisting-power that before it yields to the pressure of the arms A and A' the point of the fastener $m'$ will have been forced through the leather and will lie in the slot $b'$, ready to receive the action of the grooved finger B. As the arm A presses the metallic washer $m$ flat against the leather, the flanges $a'$, which have held the washer in position, are pressed down by the bar B', and the washer and fastener are freed from the flanges. As the grooved finger B descends through the slot $b'$ its outer and longest point comes first in contact with the point of the fastener and bends it inwardly, the point of the fastener necessarily following the curved groove in the end of the finger until the end of the finger reaches the eye of the button, when the metal of the fastener will have entirely encircled the metal of the eye, and thus securely fastened the button in position.

Having thus explained my invention, what I claim as new, and desire to secure by Letters Patent, is—

The arm A, slotted as shown, and provided with the spring $a$, having the flanges $a'$, and the arm A', provided with the grooved finger B, in combination with the bar B', provided with the slot $b'$ and side springs, $c\ c$, and recessed to receive the button and the interposed spring D, all constructed to operate substantially as and for the purpose set forth.

ALEXANDER G. WILKINS.

Witnesses:
JAS. P. RYON,
E. J. REDMOND.